United States Patent
Asanuma et al.

(10) Patent No.: US 11,175,172 B2
(45) Date of Patent: Nov. 16, 2021

(54) LIQUID LEVEL DETECTION DEVICE, ACCUMULATOR, AND AIR-CONDITIONING APPARATUS

(71) Applicant: Mitsubishi Electric Corporation, Tokyo (JP)

(72) Inventors: Hiroaki Asanuma, Tokyo (JP); Hiroyuki Okano, Tokyo (JP); Kazuki Okochi, Tokyo (JP); Hiroki Maruyama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/646,184

(22) PCT Filed: Sep. 12, 2018

(86) PCT No.: PCT/JP2018/033805
§ 371 (c)(1),
(2) Date: Mar. 11, 2020

(87) PCT Pub. No.: WO2019/065242
PCT Pub. Date: Apr. 4, 2019

(65) Prior Publication Data
US 2020/0271503 A1 Aug. 27, 2020

(30) Foreign Application Priority Data
Sep. 29, 2017 (WO) .................. PCT/JP2017/035433

(51) Int. Cl.
*G01F 23/24* (2006.01)
(52) U.S. Cl.
CPC ................................ *G01F 23/246* (2013.01)

(58) Field of Classification Search
CPC ...... G01F 23/24; G01F 23/241; G01F 23/242; G01F 23/246; G01F 23/247; G01F 23/248; F25B 43/006
See application file for complete search history.

(56) References Cited

U.S. PATENT DOCUMENTS

| 6,467,284 | B1 * | 10/2002 | Chen | F25B 43/006 |
| | | | | 62/156 |
| 7,028,767 | B2 * | 4/2006 | Takano | B60H 1/3213 |
| | | | | 165/202 |

(Continued)

FOREIGN PATENT DOCUMENTS

| EP | 2 966 379 A1 | 1/2016 |
| JP | S54-148965 U | 10/1979 |

(Continued)

OTHER PUBLICATIONS

International Search Report of the International Searching Authority dated Oct. 9, 2018 for the corresponding international application No. PCT/JP2018/033805 (and English translation).

(Continued)

*Primary Examiner* — Justin N Olamit
(74) *Attorney, Agent, or Firm* — Posz Law Group, PLC

(57) ABSTRACT

A liquid level detection device detecting a liquid level of a liquid in a container includes a heater configured to heat the container, a plurality of temperature sensors provided at different heights of the container, and configured to detect a surface temperature of the container, and a controller configured to detect the liquid level of the liquid in the container, based on the surface temperature of the container detected by the plurality of temperature sensors when the heater is caused to heat.

19 Claims, 10 Drawing Sheets

(56) References Cited

U.S. PATENT DOCUMENTS

| | | | | |
|---|---|---|---|---|
| 10,488,059 B2* | 11/2019 | Phillips | ................... | F25B 5/02 |
| 2011/0000240 A1 | 1/2011 | Yamada et al. | | |
| 2015/0292932 A1* | 10/2015 | Ochiai | ................... | G01F 23/22 |
| | | | | 62/498 |

FOREIGN PATENT DOCUMENTS

| | | | |
|---|---|---|---|
| JP | 2001-349765 A | | 12/2001 |
| JP | 2013-096772 A | | 5/2013 |
| WO | 2009/107615 A1 | | 9/2009 |
| WO | WO-2014118904 A1 | * | 8/2014 |
| WO | 2014/136187 A1 | | 9/2014 |

OTHER PUBLICATIONS

Office Action dated Jul. 7, 2020 issued in corresponding JP patent application No. 2019-544550 (and English translation).

\* cited by examiner

LIQUID LEVEL DETECTION DEVICE, ACCUMULATOR, AND AIR-CONDITIONING APPARATUS

CROSS REFERENCE TO RELATED APPLICATIONS

This application is a U.S. national stage application of PCT/JP2018/033805 filed on Sep. 12, 2018, which claims priority to International Patent Application No. PCT/JP2017/035433 filed on Sep. 29, 2017, the contents of which are incorporated herein by reference.

TECHNICAL FIELD

The present disclosure relates to a liquid level detection device detecting a liquid level of a liquid in a container, an accumulator, and an air-conditioning apparatus.

BACKGROUND ART

Up to current times, an air-conditioning apparatus has been provided with an accumulator for storing surplus refrigerant or the like the amount of which corresponds to the difference between the amount of the refrigerant that flows during the heating operation mode and the amount of the refrigerant that flows during the cooling operation mode. When the amount of refrigerant that is fed to the compressor is not stabilized, and the stored surplus refrigerant increases, there arises the problem that excessive liquid refrigerant is supplied to the compressor from the accumulator, and a malfunction occurs when the compressor compresses the liquid refrigerant.

Under such circumstances, various methods for determining whether or not liquid refrigerant is stored in accumulators have been proposed (refer to Patent Literature 1, for example). In the air-conditioning apparatus described in Patent Literature 1, whether or not liquid refrigerant is stored in the accumulator is determined based on the temperature difference between a pipe temperature on an accumulator inlet side and a pipe temperature on an accumulator outlet side. In this way, it has hitherto been able to be determined whether or not a liquid is stored in the container.

CITATION LIST

Patent Literature

Patent Literature 1: International Publication No. WO 2009/107615

SUMMARY OF INVENTION

Technical Problem

However, in the method described in Patent Literature 1, it can be determined whether or not the liquid is stored in the container, but it cannot be determined how much liquid is stored. Therefore, at a time point when it is determined that the liquid refrigerant is stored, the surplus refrigerant stored in the accumulator increases excessively, whereby there arises the fear that the liquid refrigerant is suctioned into the compressor, and a malfunction occurs.

In light of the problem associated with the related art as mentioned above, the present disclosure aims at providing a liquid level detection device capable of detecting an amount of a liquid in a container in which the liquid is stored, an accumulator and an air-conditioning apparatus.

Solution to Problem

A liquid level detection device of one embodiment of the present disclosure is a liquid level detection device detecting a liquid level of a liquid in a container, and includes a heater configured to heat the container, a plurality of temperature sensors provided at different heights of the container, and configured to detect a surface temperature of the container, and a controller configured to detect the liquid level of the liquid in the container, based on the surface temperature of the container detected by the plurality of temperature sensors when the heater is caused to heat.

Advantageous Effects of Invention

As mentioned above, according to one embodiment of the present disclosure, an amount of the liquid in the container where the liquid is stored can be detected by detecting the surface temperature of the heated container.

DESCRIPTION OF EMBODIMENTS

Embodiment 1

Figure 1:
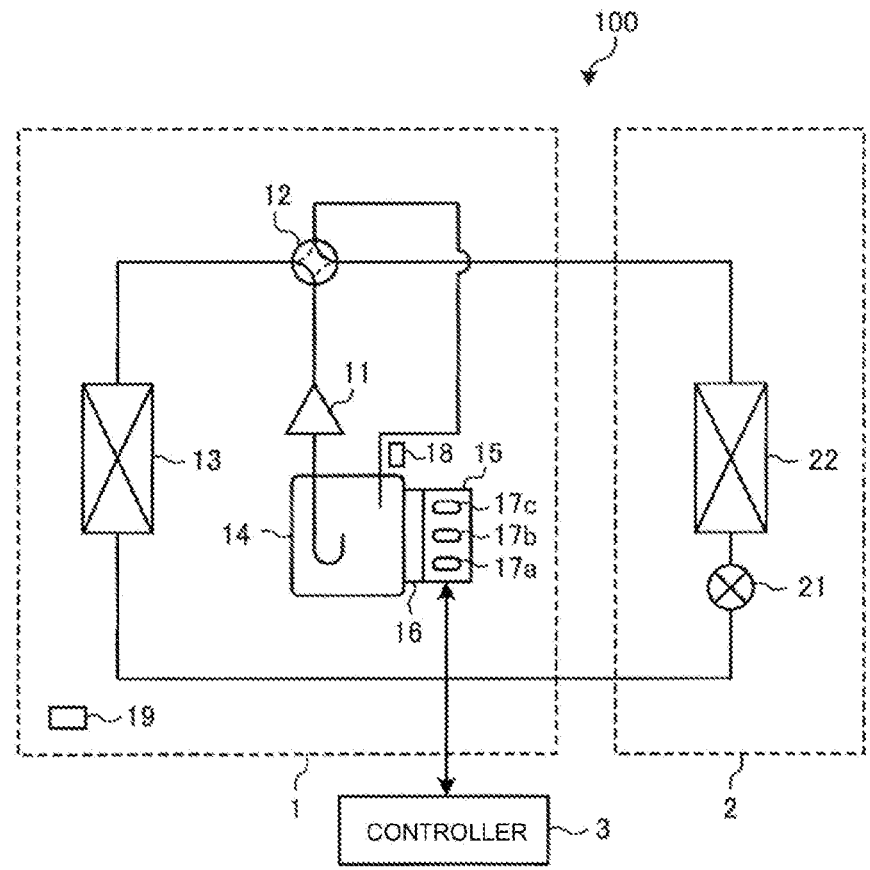
FIG. 1 is a schematic diagram illustrating an example of a configuration of an air-conditioning apparatus according to Embodiment 1.

An air-conditioning apparatus according to Embodiment 1 of the present disclosure will be described hereinafter. FIG. 1 is a schematic diagram illustrating an example of a configuration of an air-conditioning apparatus 100 according to the present Embodiment 1. As illustrated in FIG. 1, the air-conditioning apparatus 100 includes an outdoor unit 1, an indoor unit 2, and a controller 3. The outdoor unit 1 and the indoor unit 2 are connected by a refrigerant pipe, whereby a refrigerant circuit is formed. In the example illustrated in FIG. 1, the one indoor unit 2 is connected to the outdoor unit 1, but the number of indoor units 2 is not limited to this, and a plurality of indoor units 2 may be connected. Further, a plurality of outdoor units 1 may be connected.

[Configuration of Air-Conditioning Apparatus 100]

(Outdoor Unit 1)

The outdoor unit 1 includes the compressor 11, a refrigerant flow switching device 12, an outdoor heat exchanger 13 and an accumulator 14. The compressor 11 suctions low-temperature and low-pressure refrigerant, compresses the suctioned refrigerant, and discharges high-temperature and high-pressure refrigerant. The compressor 11 is an inverter compressor or other compressors in which a capacity that is a delivery amount per unit time is controlled by changing a compressor frequency, for example. The compressor frequency of the compressor 11 is controlled by the controller 3.

The refrigerant flow switching device 12 is, for example, a four-way valve, and switches a cooling operation and a heating operation by switching a direction in which the refrigerant flows. The refrigerant flow switching device 12 switches so that a discharge side of the compressor 11 and the outdoor heat exchanger 13 are connected to each other as illustrated by a solid line in FIG. 1 at a cooling operation time. Further, the refrigerant flow switching device 12 switches so that the discharge side of the compressor 11 and an indoor heat exchanger 22 of the indoor unit 2 are connected to each other as illustrated by a dotted line in FIG. 1 at a heating operation time. Switch of a flow in the refrigerant flow switching device 12 is controlled by the controller 3.

The outdoor heat exchanger 13 causes heat exchange to be performed between outdoor air supplied by a fan or the like not illustrated and refrigerant. The outdoor heat exchanger 13 functions as a condenser that condenses the refrigerant by radiating heat of the refrigerant to outdoor air at the time of cooling operation. Further, the outdoor heat exchanger 13 functions as an evaporator configured to evaporate the refrigerant, and cool the outdoor air by heat of vaporization at the time of evaporation of the refrigerant at the time of heating operation.

The accumulator 14 is provided at a low-pressure side that is a suction side of the compressor 11. The accumulator 14 separates surplus refrigerant the amount of which corresponds to the difference between the amount of the refrigerant that flows during the heating operation mode and the amount of the refrigerant that flows during the cooling operation mode, or the amount of which corresponds to the difference between the amount of the refrigerant that flows after a transient change of the operation and the amount of the refrigerant that flows before the transient change of the operation, or the like into gaseous refrigerant and liquid refrigerant, and stores the liquid refrigerant.

Further, the outdoor unit 1 includes a refrigerant temperature sensor 18 and an outside air temperature sensor 19. The refrigerant temperature sensor 18 is provided at a refrigerant entrance side of the accumulator 14, and detects a temperature of the refrigerant flowing into the accumulator 14. The outside air temperature sensor 19 detects a temperature of outside air.

(Indoor Unit 2)

The indoor unit 2 includes an expansion valve 21 and an indoor heat exchanger 22. The expansion valve 21 expands the refrigerant. The expansion valve 21 is configured by a valve capable of controlling an opening degree such as an electronic expansion valve, for example. The opening degree of the expansion valve 21 is controlled by the controller 3.

The indoor heat exchanger 22 causes heat exchange to be performed between air supplied by a fan or the like not illustrated and the refrigerant. Thereby, heating air or cooling air to be supplied to an indoor space is generated. The indoor heat exchanger 22 functions as an evaporator when the refrigerant transfers cooling energy at the time of the cooling operation, and performs cooling by cooling air in an air-conditioned space. Further, the indoor heat exchanger 22 functions as a condenser when the refrigerant transfers heating energy at the time of a heating operation, and performs heating by heating air in the air-conditioned space.

(Controller 3)

The controller 3 controls a compressor frequency of the compressor 11, the opening degree of the expansion valve 21 and the like, based on a detection result of a liquid level of the refrigerant in the accumulator 14. The controller 3 is one in which various functions are realized by executing software on an arithmetic and logic unit such as a microcomputer or is configured by hardware or the like such as a circuit device configured to realize various functions. In this example, the controller 3 is provided outside of the outdoor unit 1 and the indoor unit 2, but is not limited to this, and may be provided in either one of the outdoor unit 1 and the indoor unit 2.

Here, to the accumulator 14 in the present Embodiment 1, a liquid level detection device 15 for detecting a liquid level of the refrigerant stored in the accumulator 14 is attached. The liquid level detection device 15 includes a heater 16 and a plurality of temperature sensors 17a to 17c. In this example, the three temperature sensors 17a to 17c are provided, but the number of temperature sensors is not limited to this, and two or four or more temperature sensors may be provided as long as they are plural.

The heater 16 uniformly heats a surface of the accumulator 14 relative to a height direction (Z-direction) based on control of the controller 3. The plurality of temperature sensors 17a to 17c are respectively disposed at different heights with respect to the accumulator 14, and detects a surface temperature of the accumulator 14 in the heights where the plurality of temperature sensors 17a to 17c are disposed. The temperature sensor 17a detects a surface temperature Ta of a lower portion in the accumulator 14. The temperature sensor 17b detects a surface temperature Tb of a middle portion in the accumulator 14. The temperature sensor 17c detects a surface temperature Tc of an upper portion in the accumulator 14.

The controller 3 controls a liquid level detection action by the liquid level detection device 15, based on the temperatures detected by the temperature sensors 17a to 17c of the liquid level detection device 15, the refrigerant temperature sensor 18, the outside air temperature sensor 19 or other temperatures.

Figure 2:
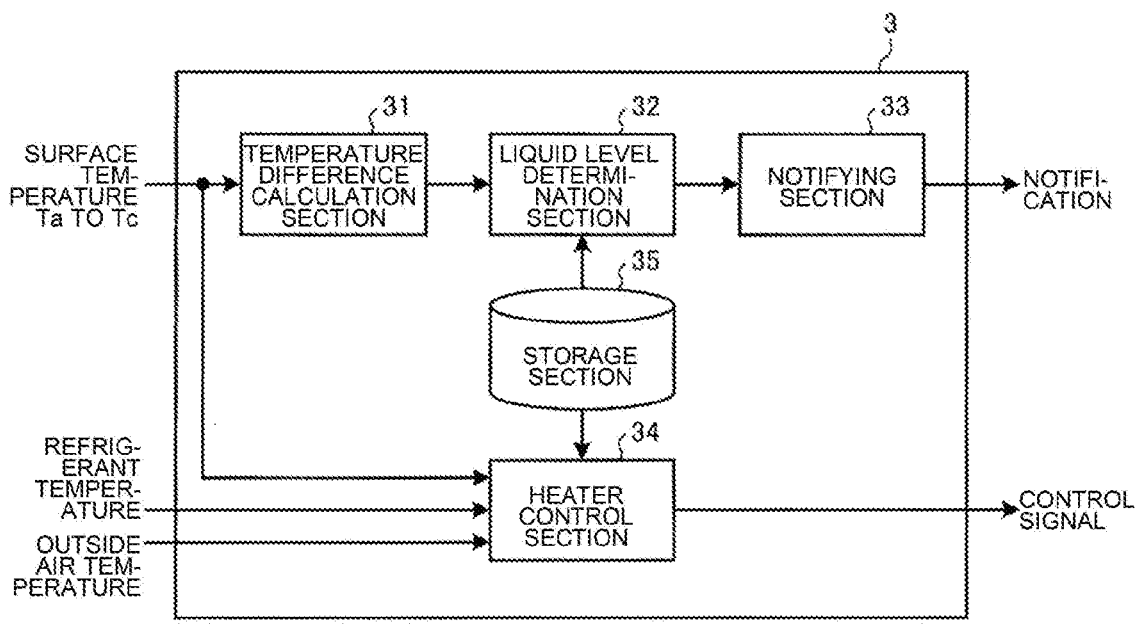
FIG. 2 is a functional block diagram illustrating an example of a configuration of a controller in FIG. 1.

FIG. 2 is a functional block diagram illustrating an example of a configuration of the controller 3 in FIG. 1. As illustrated in FIG. 2, the controller 3 includes a temperature difference calculation section 31, a liquid level determination section 32, a notifying section 33, a heater control section 34 and a storage section 35.

The temperature difference calculation section 31 calculates a temperature difference $\Delta T_{high}$ obtained by subtracting the surface temperature Ta of the accumulator 14 detected by the temperature sensor 17a from the surface temperature Tc of the accumulator 14 detected by the temperature sensor 17c. Further, the temperature difference calculation section 31 calculates a temperature difference $\Delta T_{middle}$ obtained by subtracting the surface temperature Ta of the accumulator 14 detected by the temperature sensor 17a from the surface temperature Tb of the accumulator 14 detected by the temperature sensor 17b.

The liquid level determination section 32 reads a set value T1 stored in the storage section 35, and compares the temperature difference $\Delta T_{high}$ and the temperature difference $\Delta T_{middle}$ that are calculated in the temperature difference calculation section 31, and the set value T1. Subsequently, the liquid level determination section 32 determines a position of the liquid level of the liquid refrigerant in the accumulator 14, based on a comparison result.

The notifying section 33 notifies information concerning the position of the liquid level in the accumulator 14 based on a determination result by the liquid level determination section 32. As the notifying section 33, for example, a display, a light emitting diode (LED), a speaker or other devices are used. When the notifying section 33 is a display, the information concerning the position of the liquid level is displayed in characters, figures or the like. When the notifying section 33 is an LED, the information concerning the position of the liquid level is displayed by lighting, flashing, lighting-out, or the like. When the notifying section 33 is a speaker, the information concerning the position of the liquid level is notified by sound.

The heater control section 34 controls on/off of the heater 16 based on various temperatures detected by the temperature sensors 17a to 17c, the refrigerant temperature sensor 18 and the outside air temperature sensor 19. The heater control section 34 supplies a control signal for controlling on/off of the heater 16 to the heater 16.

The storage section 35 stores set values or other values used for processing in the respective sections of the controller 3. A set value T1 as a threshold to be used in the liquid level determination section 32 is stored in the storage section 35 in advance. Further, set temperatures T2, T3 and T4 to be used in the heater control section 34 are stored in the storage section 35 in advance.

[Structure of Liquid Level Detection Device 15]

Figure 3:
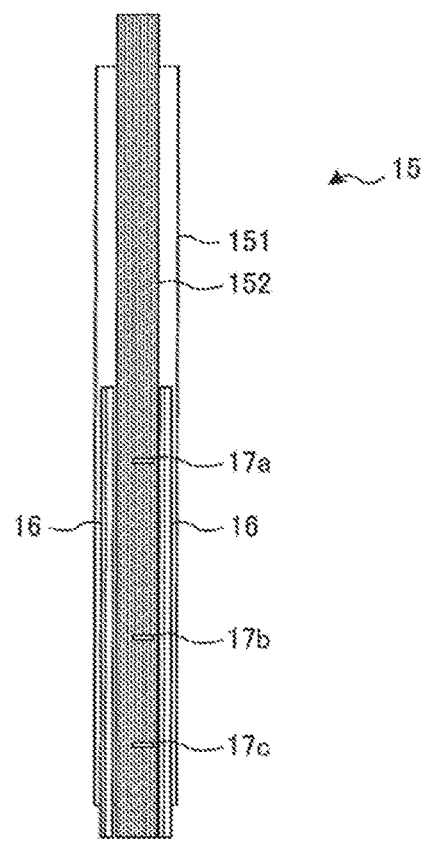
FIG. 3 is a plan view illustrating an example of a structure of a liquid level detection device in FIG. 1.

A structure of the liquid level detection device 15 will be described. FIG. 3 is a plan view illustrating an example of the structure of the liquid level detection device 15 in FIG. 1. As illustrated in FIG. 3, the liquid level detection device 15 has a belt section 151, a heat-insulating material 152, the heater 16 and the temperature sensors 17a to 17c.

The belt section 151 is formed of a long metal material such as an aluminum tape. The belt section 151 has a length corresponding to a shape and a size of the accumulator 14 to which the belt section 151 is attached, and is wound along the height direction (Z-direction) of the accumulator 14.

The heat-insulating material 152 is provided on a surface of the belt section 151. The heat-insulating material 152 is formed to extend in the longitudinal direction of the belt section 151. The heaters 16 are provided on the surface of the belt section 151. The heaters 16 are bendable belt heaters, for example, and are provided to extend along both ends of the heat-insulating material 152.

The length of the heater 16 may be shorter than the total length in the longitudinal direction of the belt section 151, and is determined depending on the size of the accumulator 14. For example, the length of the heater 16 is preferably a length substantially same as a total length in the height direction (Z-direction) of the accumulator 14 when the liquid level detection device 15 is attached to the accumulator 14. The number of heaters 16 is not limited to plural. For example, if the heater 16 can sufficiently heat the accumulator 14, the number of heaters 16 may be one.

The temperature sensors 17a to 17c are provided on the heat-insulating material 152. In other words, when the plurality of heaters 16 are provided on the liquid level detection device 15, the temperature sensors 17a to 17c are provided such that it is interposed between the plurality of heaters 16. The respective disposing positions of the temperature sensors 17a to 17c are determined depending on heights where the surface temperatures of the accumulator 14 is detected when the liquid level detection device 15 is attached to the accumulator 14.

The reason why the heaters 16 are provided at both ends in a longitudinal direction of the heat-insulating material 152, and in the height direction (Z-direction) of the accumulator 14 in this way is to heat the accumulator 14 uniformly relative to the height of the accumulator 14 when heating the accumulator 14 by the heaters 16. Further, the reason why the temperature sensors 17a to 17c are provided on the heat-insulating material 152 is to prevent heat of the heaters 16 and heat from outside or the like from being transferred to the temperature sensors 17a to 17c when detecting the surface temperatures of the accumulator 14 by the temperature sensors 17a to 17c. Further, the reason why the temperature sensors 17a to 17c are provided such that it is interposed between the plurality of heaters 16 is to detect the surface temperatures of the accumulator 14 with high precision.

Figure 4:
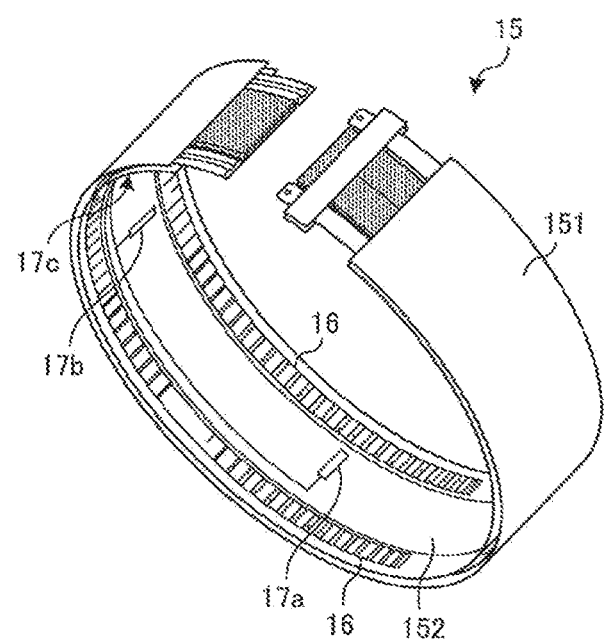
FIG. 4 is a schematic view for explaining a shape of the liquid level detection device in FIG. 3 at a time of being attached to an accumulator.

FIG. 4 is a schematic view for explaining a shape of the liquid level detection device 15 in FIG. 3 at a time of being attached to the accumulator 14. In the liquid level detection device 15 illustrated in FIG. 3, the belt section 151 and the heaters 16 are made bendable, and thereby the liquid level detection device 15 can be bent depending on the shape of the accumulator 14 as illustrated in FIG. 4.

[Attaching of Liquid Level Detection Device 15]

Figure 5:
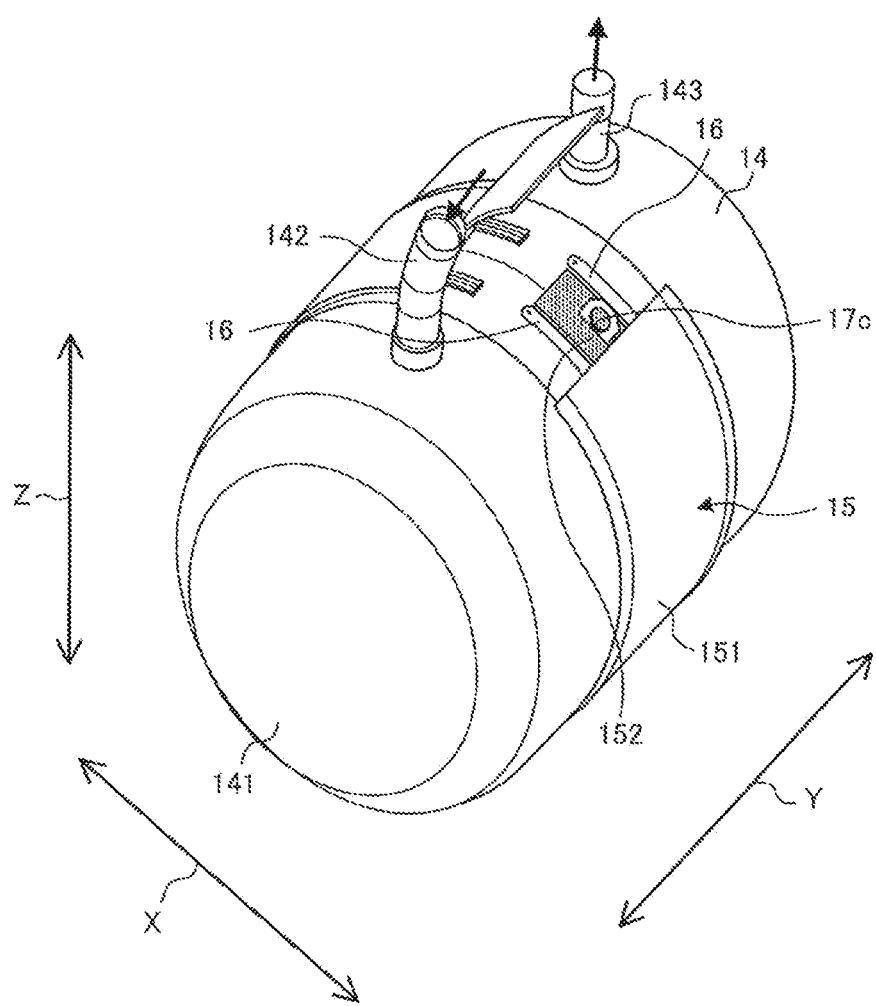
FIG. 5 is a perspective view illustrating a state where the liquid level detection device is attached to the accumulator.

FIG. 5 is a perspective view illustrating a state where the liquid level detection device 15 is attached to the accumulator 14. As illustrated in FIG. 5, the liquid level detection device 15 is attached to the accumulator 14 to be wound around the accumulator 14 so that the longitudinal direction of the belt section 151 is directed in the vertical direction.

At this time, the belt section 151 is bent so that a top surface of the belt section 151 provided with the heater 16 and the temperature sensors 17a to 17c is an inner circumferential surface. The liquid level detection device 15 is attached so that the heaters 16 and the temperature sensors 17a to 17c contact the surface of the accumulator 14.

Figure 6:
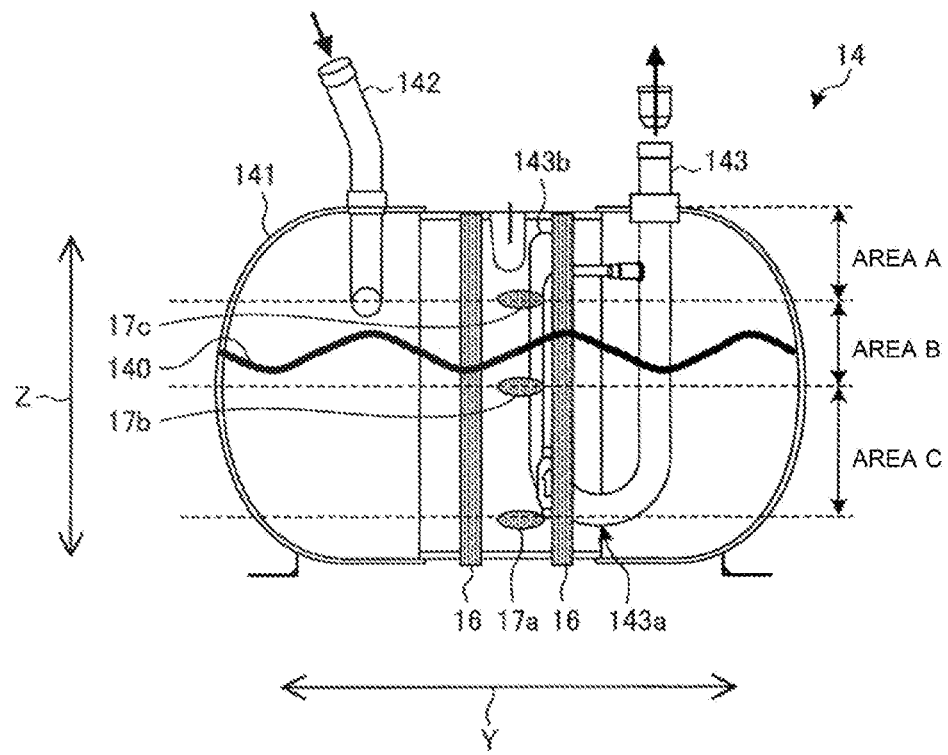
FIG. 6 is a sectional view schematically illustrating a state where the liquid level detection device is attached to the accumulator.

FIG. 6 is a sectional view schematically illustrating a state where the liquid level detection device 15 is attached to the accumulator 14. As illustrated in FIG. 6, the liquid level detection device 15 is attached to the accumulator 14 so that the temperature sensors 17a to 17c are located at the predetermined heights.

In an example illustrated in FIG. 6, the accumulator 14 includes an inflow pipe 142 configured to introduce the refrigerant inside, and a U-shaped outflow pipe 143 configured to supply internal refrigerant to the compressor 11, in a sealed container 141. In the outflow pipe 143, a liquid inlet 143a allowing liquid refrigerant to flow in, and a gas inlet 143b taking in gaseous refrigerant are formed.

In particular, the temperature sensor 17a is located at a position where the temperature sensor 17a can detect a surface temperature of a lower portion of the accumulator 14. Specifically, the temperature sensor 17a provided at a lowermost portion is located at a side lower than the liquid inlet 143a of the outflow pipe 143 of the accumulator 14. This is to enable the temperature sensor 17a to detect the surface temperature of the accumulator 14 in the position where the liquid refrigerant always exits.

Further, the temperature sensor 17c is located in a position where the temperature sensor 17c can detect a surface temperature of an upper portion of the accumulator 14. Specifically, the temperature sensor 17c provided at an uppermost portion is located in a position at a lower side from the gas inlet 143b of the outflow pipe 143 of the accumulator 14. This is to prevent a liquid level 140 of the liquid refrigerant from reaching an upper side of the gas inlet 143b at the time of liquid level detection.

The temperature sensor 17b can be located at a position at an arbitrary height between the temperature sensor 17a and the temperature sensor 17c. Specifically, the temperature sensor 17b is preferably located at a position where the liquid level 140 is desired to be detected.

When the positions of the temperature sensors 17a to 17c are determined as described above, an area from a top surface of the accumulator 14 to the temperature sensor 17c is referred to as an area A in the following explanation. Further, an area from the temperature sensor 17c to the temperature sensor 17b is referred to as an area B, and an area from the temperature sensor 17b to the temperature sensor 17a is referred to as an area C. Note that an area from the temperature sensor 17a to a bottom surface is an area where the liquid refrigerant is always present. This is because the temperature sensor 17a is located at a lower side from the liquid inlet 143a, and on the lower side from the liquid inlet 143a, the stored liquid refrigerant remains without being suctioned into the outflow pipe 143.

Note that the temperature sensor 17a corresponds to a "reference temperature sensor" and a "first temperature sensor" in the present disclosure. The temperature sensors 17b and 17c correspond to a "determination temperature sensor" in the present disclosure. The temperature sensor 17c also corresponds to a "second temperature sensor" in the present disclosure.

[Liquid Level Detection Processing]

Figure 7:
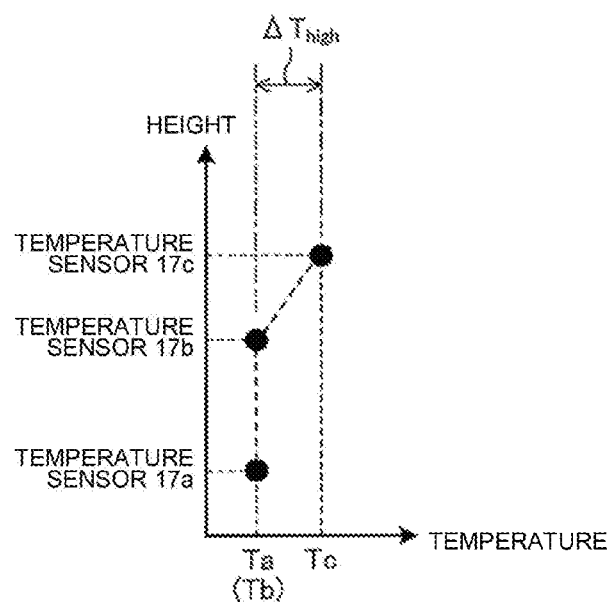
FIG. 7 is a graph for explaining a relationship between a surface temperature of the accumulator and a height of a temperature sensor.

A detection method of the liquid level 140 in the liquid refrigerant in the accumulator 14, according to the present Embodiment 1 will be described. FIG. 7 is a graph for explaining the relationship between the surface temperatures of the accumulator 14 and the heights of the temperature sensors 17a to 17c. FIG. 7 illustrates surface temperatures at the positions of the respective temperature sensors 17a to 17c in the case where the liquid level 140 of the liquid refrigerant in the accumulator 14 exists in the area B as illustrated in FIG. 6.

As illustrated in FIG. 7, the surface temperatures of the accumulator 14 which are detected differ in the temperature sensor 17c located at the upper side from the liquid level 140 of the liquid refrigerant existing in the area B, and the temperature sensors 17a and 17b located at the lower side from the liquid level 140 of the liquid refrigerant. Specifically, the surface temperature Tc detected by the temperature sensor 17c is higher than the surface temperature Ta detected by the temperature sensor 17a and the surface temperature Tb detected by the temperature sensor 17b. This is because thermal conductivity by the liquid refrigerant and thermal conductivity by gas differ from each other, and therefore, the surface temperature of the accumulator 14 varies after heating.

Thus, in the present Embodiment 1, the liquid level 140 in the accumulator 14 is detected based on the surface temperatures Ta to Tc of the accumulator 14 after heating that are respectively detected by the temperature sensors 17a to 17c of the liquid level detection device 15.

In the present Embodiment 1, the temperature sensor 17a is provided at the position where the liquid refrigerant always exists. Accordingly, the temperature sensor 17a detects the surface temperature of the accumulator 14 in the liquid area where the liquid refrigerant always exists, and therefore, the temperature detected at this time can be made a reference temperature.

Here, when the temperature sensor 17b or 17c is located at the side lower than the liquid level 140 of the liquid refrigerant, and the surface temperature of the accumulator 14 in the liquid area is detected, the surface temperature detected by the temperature sensor 17b or 17c is substantially equivalent to the surface temperature detected by the temperature sensor 17a. On the other hand, when the temperature sensor 17b or 17c is located at the upper side from the liquid level 140 of the liquid refrigerant, and detects the surface temperature of the accumulator 14 in the gas area, the surface temperature detected by the temperature sensor 17b or 17c is higher than the surface temperature detected by the temperature sensor 17a.

In other words, a temperature difference between the surface temperatures detected by the temperature sensors 17b and 17c, and the surface temperature detected by the temperature sensor 17a are separately calculated, and is compared with a set value as a threshold, whereby it can be determined in which area of the areas A to C the liquid level 140 exists.

The temperature difference between the surface temperature of the accumulator 14 in the liquid area, and the surface temperature of the accumulator 14 in the gas area differs according to a heating capacity or the like of the heater 16 that heats. Therefore, the value of the set value as the threshold is determined in advance depending on the heating capacity or the like of the heater 16.

The liquid level detection processing is performed after the accumulator 14 is heated by the heater 16 being turned on, and the heater 16 is turned on in consideration of safety of the air-conditioning apparatus 100.

In the present Embodiment 1, the heater control section 34 controls the heater 16 to be turned on when the respective surface temperatures Ta to Tc of the accumulator 14 detected by the temperature sensors 17a to 17c are equal to or lower than a set temperature T2. The set temperature T2 is an outside air temperature at which the air-conditioning apparatus 100 guarantees operation or a temperature slightly higher than the outside air temperature and is set in advance. This is to prevent the liquid level detection processing from being performed when the outside air temperature falls outside the guarantee of operation of the air-conditioning apparatus 100.

Further, the heater control section 34 controls the heater 16 to be turned on when a temperature difference between the surface temperature detected by the temperature sensor 17a and the refrigerant temperature at the entrance side of the accumulator 14 detected by the refrigerant temperature sensor 18 is a set temperature T3 or less. The set temperature T3 is set so that the liquid refrigerant stored in the accumulator 14 does not evaporate. This is to prevent the liquid refrigerant in the accumulator 14 from evaporating to be gaseous refrigerant, when the accumulator 14 is heated by the heater 16.

Further, when the outside air temperature detected by the outside air temperature sensor 19 is equal to or lower than a set temperature T4 set in advance, the heater control section 34 may control the heater 16 to be turned on. Further, control of turning on and off of the heater 16 is not limited to the case of considering safety as in this case, but turning on and off may be repeated every set time, for example.

Figure 8:
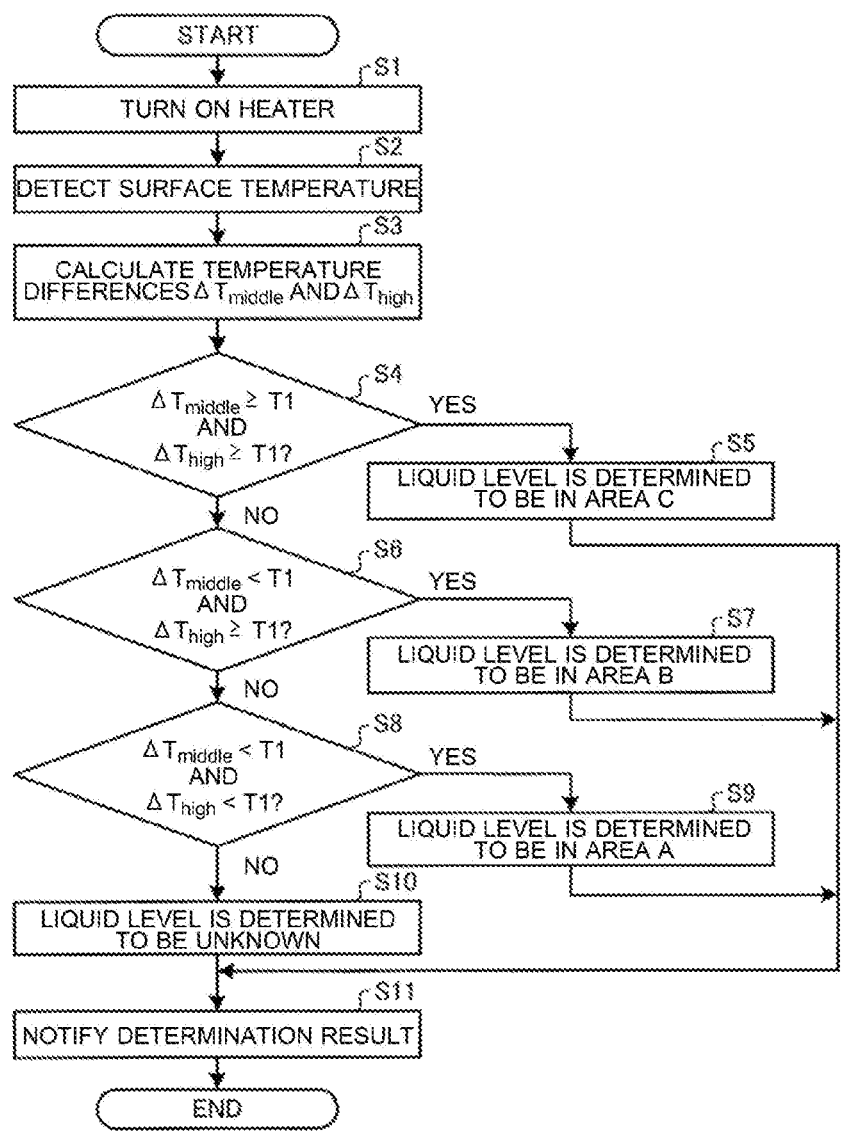
FIG. 8 is a flowchart illustrating an example of a flow of liquid level detection processing in an air-conditioning apparatus 100 according to Embodiment 1.

FIG. 8 is a flowchart illustrating an example of a flow of the liquid level detection processing in the air-conditioning apparatus 100 according to the present Embodiment 1. In step S1, the heater control section 34 controls the heaters 16 to be turned on, whereby the accumulator 14 is heated. In step S2, after a set time period lapses after the heaters 16 are turned on, the temperature sensors 17a to 17c respectively detect the surface temperatures Ta to Tc of the accumulator 14.

In step S3, the temperature difference calculation section 31 calculates the temperature difference $\Delta T_{middle}$ and the temperature difference $\Delta T_{high}$, based on the surface temperatures Ta to Tc respectively detected in the temperature sensors 17a to 17c. The temperature difference $\Delta T_{middle}$ between the surface temperature Tb detected by the temperature sensor 17b and the surface temperature Ta as the reference temperature detected by the temperature sensor 17a is calculated based on expression (1). Further, the temperature difference $\Delta T_{high}$ between the surface temperature Tc detected by the temperature sensor 17c and the surface temperature Ta detected by the temperature sensor 17a is calculated based on formula (2).

Temperature difference $\Delta T_{middle}$=Tb-Ta  (1)

Temperature difference $\Delta T_{high}$=Tc-Ta  (2)

Next, the liquid level determination section 32 reads the set value T1 relative to the temperature difference $\Delta T_{middle}$ and the temperature difference $\Delta T_{high}$ from the storage section 35. Subsequently, the liquid level determination section 32 compares the temperature difference $\Delta T_{middle}$ and the temperature difference $\Delta T_{high}$ calculated in step S3, and the set value T1 read from the storage section 35.

In step S4, the liquid level determination section 32 determines whether or not the temperature difference $\Delta T_{middle}$ is equal to or larger than the set value T1, and the temperature difference $\Delta T_{high}$ is equal to or larger than the set value T1. A determination condition at this time shows that the positions of the temperature sensor 17b and the temperature sensor 17c are in the gas area where the liquid refrigerant does not exist.

When the temperature difference $\Delta T_{middle}$ is equal to or larger than the set value T1, and the temperature difference $\Delta T_{high}$ is equal to or larger than the set value T1 (S4; Yes), the liquid level determination section 32 determines that the area A and the area B are the gas area, and the liquid level 140 exists in the area C, in step S5. On the other hand, in a case except for the case where the temperature difference $\Delta T_{middle}$ is equal to or larger than the set value T1, and the temperature difference $\Delta T_{high}$ is equal to or larger than the set value T1 (S4; No), the process proceeds to step S6.

In step S6, the liquid level determination section 32 determines whether or not the temperature difference $\Delta T_{high}$ is equal to or larger than the set value T1, and the temperature difference $\Delta T_{middle}$ is less than the set value T1. A determination condition at this time shows that the position of the temperature sensor 17b is in the gas area, and the position of the temperature sensor 17c is in the liquid area where the liquid refrigerant exists.

When the temperature difference $\Delta T_{high}$ is equal to or larger than the set value T1, and the temperature difference $\Delta T_{middle}$ is less than the set value T1 (S6; Yes), the liquid level determination section 32 determines that the area A is the gas area, and the liquid level 140 of the liquid refrigerant exists in the area B in step S7. On the other hand, in a case except for the case where the temperature difference $\Delta T_{high}$ is equal to or larger than the set value T1, and the temperature difference $\Delta T_{middle}$ is less than the set value T1 (S6; No), the process proceeds to step S8.

In step S8, the liquid level determination section 32 determines whether or not the temperature difference $\Delta T_{high}$ is less than the set value T1, and the temperature difference $\Delta T_{middle}$ is less than the set value T1. A determination condition at this time shows that the positions of the temperature sensor 17b and the temperature sensor 17c are in the liquid area.

When the temperature difference $\Delta T_{high}$ is less than the set value T1, and the temperature difference $\Delta T_{middle}$ is less than the set value T1 (S8; Yes), the liquid level determination section 32 determines that the liquid level 140 of the liquid refrigerant exists in the area A in step S9. On the other hand, in a case except for the case where the temperature difference $\Delta T_{high}$ is less than the set value T1, and the temperature difference $\Delta T_{middle}$ is less than the set value T1 (S8; No), the liquid level determination section 32 determines it unclear in what area the liquid level 140 of the liquid refrigerant exists in step S10.

In step S11, the notifying section 33 notifies a result determined in step S5, S7, S9 or S10 to an outside.

In this way, in the present Embodiment 1, the plurality of temperature sensors 17a to 17c are disposed to be at different heights relative to the accumulator 14, and the heater 16 configured to heat the accumulator 14 is disposed. The plurality of temperature sensors 17a to 17c respectively measure the surface temperatures Ta to Tc of the accumulator 14 after heating by the heaters 16. The temperature difference calculation section 31 calculates the temperature difference $\Delta T_{middle}$ and the temperature difference $\Delta T_{middle}$ between the surface temperature Ta as the reference temperature detected by the temperature sensor 17a, and the surface temperatures Tb and Tc detected by the temperature sensors 17b and 17c. Subsequently, the liquid level determination section 32 detects the liquid level 140 of the liquid refrigerant in the accumulator 14 based on the result of comparing the temperature difference $\Delta T_{middle}$ and the temperature difference $\Delta T_{middle}$ that are calculated, and the set value T1. As a result, in the present Embodiment 1, the liquid level 140 of the liquid refrigerant in the accumulator 14 can be detected, based on the surface temperature of the accumulator 14 at the time of heating.

As mentioned above, the liquid level detection device 15 according to the present Embodiment 1 detects the surface temperatures of the container heated by the heater 16 is detected by the plurality of temperature sensors 17a to 17c provided at the different heights of the container, and detects the liquid level 140 of the liquid in the container, based on the surface temperature of the heated container. Since the surface temperatures of the heated container differ depending on the heat conductivities or the like of the contents existing at the heights of the respective temperature sensors 17a to 17c, the position of the liquid level 140 of the liquid in the container can be detected by detecting the surface temperatures at the different heights.

Further, in the liquid level detection device 15, the temperature sensor 17*a* is installed in a lowermost portion and at the position where the liquid exists, and the temperature sensors 17*b* and 17*c* are installed at the positions higher than the temperature sensor 17*a*. The temperature difference calculation section 31 calculates the temperature differences between the surface temperature detected by the temperature sensor 17*a*, and the surface temperatures detected by the temperature sensors 17*b* and 17*c* installed at the positions higher than the temperature sensor 17*a*. Subsequently, the liquid level determination section 32 compares the calculated temperature differences and the set value stored in the storage section 35, and determines the position of the liquid level 140 of the liquid in the container.

When the surface temperature at the position where the liquid exists is set as the reference temperature, and the surface temperature substantially equivalent to the reference temperature is detected, it is determined that the liquid also exists in the position where the surface temperature is detected. Accordingly, by calculating the temperature differences between the surface temperature that is the reference temperature detected by the temperature sensor 17*a*, and the surface temperatures detected by the temperature sensors 17*b* and 17*c*, the position of the liquid level 140 of the liquid in the container can be detected.

Further, when the temperature difference is equal to or larger than the set value, the liquid level determination section 32 determines that the liquid level 140 of the liquid in the container exists in the area at the lower side of the temperature sensor 17*b* or 17*c*, in the liquid level detection device 15. When the temperature difference from the reference temperature is equal to or larger than the set value, the content at the position of the temperature sensor 17*b* or 17*c* can be determined as gas instead of the liquid. Therefore, in this case, it can be determined that the liquid level 140 of the liquid exists in the area at the lower side of the temperature sensor 17*b* or 17*c* where the temperature difference is equal to or larger than the set value.

Furthermore, in the liquid level detection device 15, the controller 3 further has the notifying section 33 configured to notify the determination result by the liquid level determination section 32. Thereby, the determination result of the liquid level 140 in the container is outputted to outside, and therefore, the determination result can be notified to a worker or the like.

Further, the liquid level detection device 15 includes the plurality of heaters 16, and the temperature sensors 17*a* to 17*c* are installed at the positions interposed between the plurality of heaters 16. As a result, the container is heated by the plurality of heaters 16, and the temperature sensors 17*a* to 17*c* detect the surface temperatures of the container heated by the plurality of heaters 16, whereby the container can be heated reliably and uniformly.

Further, the liquid level detection device 15 as described above is attached to the accumulator 14 according to the present Embodiment 1. As a result, the liquid level 140 of the liquid refrigerant stored in the accumulator 14 can be detected by the liquid level detection device 15.

Further, in the accumulator 14, the temperature sensor 17*a* is provided at the lower side from the liquid inlet 143*a* in the U-shaped outflow pipe 143, and the temperature sensor 17*c* is provided at the lower side from the gas inlet 143*b* in the outflow pipe 143. Thereby, the surface temperature of the accumulator 14 at the lower side from the liquid inlet 143*a* where the liquid refrigerant exists is detected by the temperature sensor 17*a*, and the surface temperature of the accumulator 14 at the lower side from the gas inlet 143*b* is detected by the temperature sensor 17*c*. Therefore, the surface temperature of the accumulator 14 at the position where the liquid refrigerant exists can be detected, and the liquid level 140 of the liquid refrigerant can be prevented from reaching the upper side of the gas inlet 143*b*.

Furthermore, in the accumulator 14, the liquid level detection device 15 is attached to the surface of the accumulator 14. Thereby, the liquid level detection device 15 is attached to the accumulator 14 from outside, and therefore, the liquid level detection device 15 can be attached to the existing accumulator 14.

Further, the air-conditioning apparatus 100 according to the present Embodiment 1 includes the accumulator 14 as mentioned above. Therefore, the liquid level 140 of the liquid refrigerant stored in the accumulator 14 of the air-conditioning apparatus 100 can be detected.

Embodiment 2

Next, Embodiment 2 of the present disclosure will be described. When an operation of a compressor 11 is started in a state where liquid refrigerant is stored in an accumulator 14, a liquid level of the liquid refrigerant in the accumulator 14 is waved, and "liquid back" that the liquid refrigerant is suctioned by the compressor 11 may be generated.

For example, when a compressor frequency of the compressor 11 exceeds a fixed value, a circulation amount of refrigerant flowing in a refrigerant circuit increases, a flow velocity of the refrigerant increases, and a swirl flow is generated in the accumulator 14. By the swirl flow, the liquid refrigerant in the accumulator 14 reaches the gas inlet 143*b*, the liquid refrigerant is suctioned by the compressor 11 and "liquid back" occurs.

Thus, in the present Embodiment 2, the compressor frequency at the time of actuation of the compressor 11 is controlled in response to a liquid level height of the liquid refrigerant in the accumulator 14. In the following explanation, sections common to Embodiment 1 are assigned with the same reference signs, and detailed explanation is omitted.

[Configuration of Air-Conditioning Apparatus 200]

Figure 9:
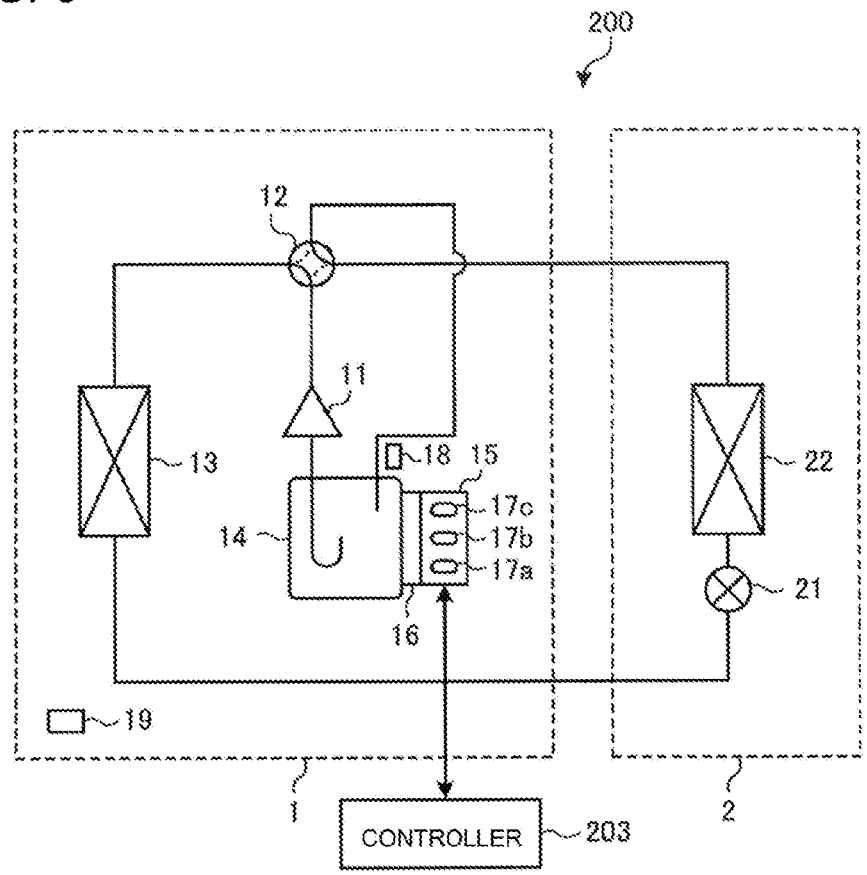
FIG. 9 is a schematic diagram illustrating an example of a configuration of an air-conditioning apparatus according to Embodiment 2.

FIG. 9 is a schematic diagram illustrating an example of a configuration of an air-conditioning apparatus 200 according to the present Embodiment 2. As illustrated in FIG. 9, the air-conditioning apparatus 200 is configured by an outdoor unit 1, an indoor unit 2, and a controller 203. The outdoor unit 1 and the indoor unit 2 are connected by a refrigerant pipe, whereby the refrigerant circuit is formed.

(Controller 203)

The controller 203 controls the compressor frequency of the compressor 11, an opening degree of an expansion valve 21 and the like, based on a detection result of the liquid level of the refrigerant in the accumulator 14, as in the case of the controller 3 according to Embodiment 1. Further, in the present Embodiment 2, the controller 203 controls the compressor frequency at the time of actuation based on the detection result of the liquid level of the refrigerant in the accumulator 14 at the time of operating the compressor 11.

The controller 203 is configured such that various functions are realized by executing software on an arithmetic and logic unit such as a microcomputer or the like, or includes hardware or the like such as a circuit device realizing the various functions. In this example, the controller 203 is provided outside of the outdoor unit 1 and the indoor unit 2, but the controller 203 is not limited to this, and may be provided in either one of the outdoor unit 1 and the indoor unit 2.

Figure 10:
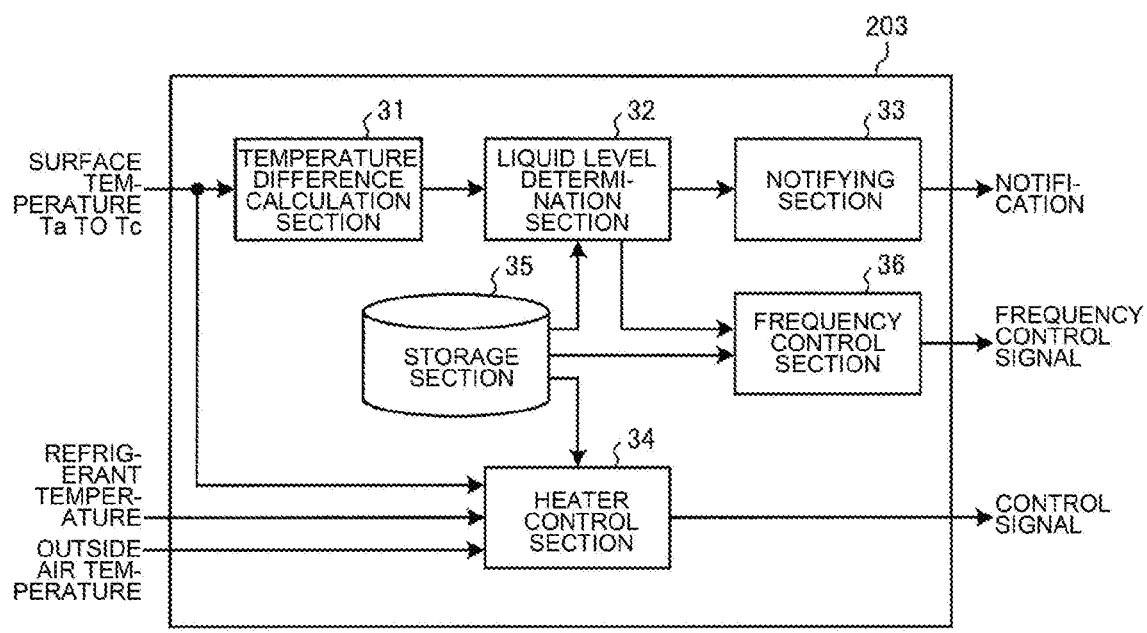
FIG. 10 is a functional block diagram illustrating an example of a configuration of a controller in FIG. 9.

FIG. 10 is a functional block diagram illustrating an example of the configuration of the controller 203 in FIG. 9. As illustrated in FIG. 10, the controller 203 includes a temperature difference calculation section 31, a liquid level determination section 32, a notifying section 33, a heater control section 34, a storage section 35 and a frequency control section 36.

In the present Embodiment 2, in the storage section 35, frequency information used in the frequency control section 36 is stored. The frequency information is information in which an area where a liquid level of the liquid refrigerant in the accumulator 14 exists, and the compressor frequency of the compressor 11 are associated with each other. Specifically, in the frequency information, the compressor frequencies are associated with respective area A to area C where liquid levels of the liquid refrigerant in the accumulator 14 exist. For example, a low compressor frequency is associated with the area A where the position of the liquid level of the liquid refrigerant is high, and a high compressor frequency is associated with the area C where the position of the liquid level is low. An intermediate compressor frequency is associated with an area B where the position of the liquid level of the liquid refrigerant is in an intermediate position between the area A and the area C. In other words, in the present Embodiment 2, the compressor frequencies are associated with the positions of the liquid levels so that as the liquid level of the liquid refrigerant in the accumulator 14 is high, the compressor frequency is low.

The frequency control section 36 refers to the frequency information stored in the storage section 35 based on the determination result by the liquid level determination section 32, and determines the compressor frequency of the compressor 11. The frequency control section 36 supplies a frequency control signal for controlling the compressor frequency to the compressor 11.

[Waving Suppression Processing]

Waving suppression processing suppressing waving of the liquid level of the liquid refrigerant in the accumulator 14 according to the present Embodiment 2 will be described. As described above, when the operation of the air-conditioning apparatus 200 is started in the state where the liquid refrigerant is stored in the accumulator 14, and the operation of the compressor 11 is started, the liquid level of the liquid refrigerant in the accumulator 14 waves, and "liquid back" that the liquid refrigerant is suctioned by the compressor 11 may be generated.

Thus, in the present Embodiment 2, in order to suppress waving of the liquid refrigerant in the accumulator 14, and prevent occurrence of "liquid back" to the compressor 11, the compressor 11 is actuated at the compressor frequency corresponding to the position of the liquid level of the liquid refrigerant in the accumulator 14.

Figure 11:
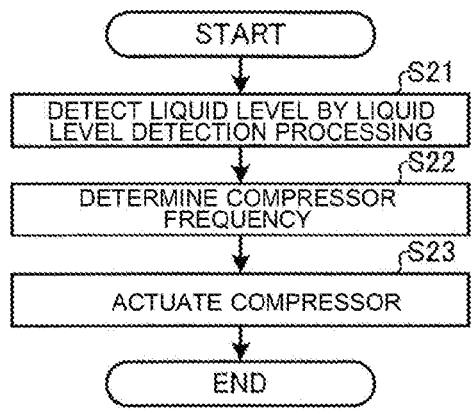
FIG. 11 is a flowchart illustrating an example of a flow of waving suppression processing in the air-conditioning apparatus according to Embodiment 2.

FIG. 11 is a flowchart illustrating an example of a flow of waving suppression processing in the air-conditioning apparatus 200 according to the present Embodiment 2. In step S21, in a state where the operation of the compressor 11 is stopped, the liquid level detection processing (refer to FIG. 8) described in Embodiment 1 is performed.

In step S22, the frequency control section 36 of the controller 203 refers to the frequency information stored in the storage section 35 and determines the compressor frequency of the compressor 11, based on the position of the liquid level of the liquid refrigerant in the accumulator 14 determined in the liquid level determination section 32. The frequency control section 36 supplies a frequency control signal indicating the determined compressor frequency to the compressor 11. In step S23, the compressor 11 starts an operation with the compressor frequency based on the received frequency control signal.

As mentioned above, in the air-conditioning apparatus 200 according to the present Embodiment 2, the compressor frequency of the compressor 11 is controlled based on the position of the liquid level of the liquid refrigerant in the accumulator 14. Thereby, when the compressor 11 is actuated, waving of the liquid refrigerant in the accumulator 14 is suppressed, and therefore, "liquid back" to the compressor 11 can be prevented.

Further, the compressor frequency is set to be lower as the position of the liquid level of the liquid refrigerant in the accumulator 14 that is detected is higher. Thereby, when the liquid refrigerant stored in the accumulator 14 is less, the compressor 11 is operated with the compressor frequency close to the compressor frequency at the time of a normal operation, and therefore, an influence on the operation of the compressor 11 can be reduced.

Embodiment 3

Next, Embodiment 3 of the present disclosure will be described. Embodiment 3 differs from Embodiments 1 and 2 in that a bypass is provided between a high-pressure side and a low-pressure side of a compressor 11.

[Configuration of Air-Conditioning Apparatus 300a]

Figure 12:
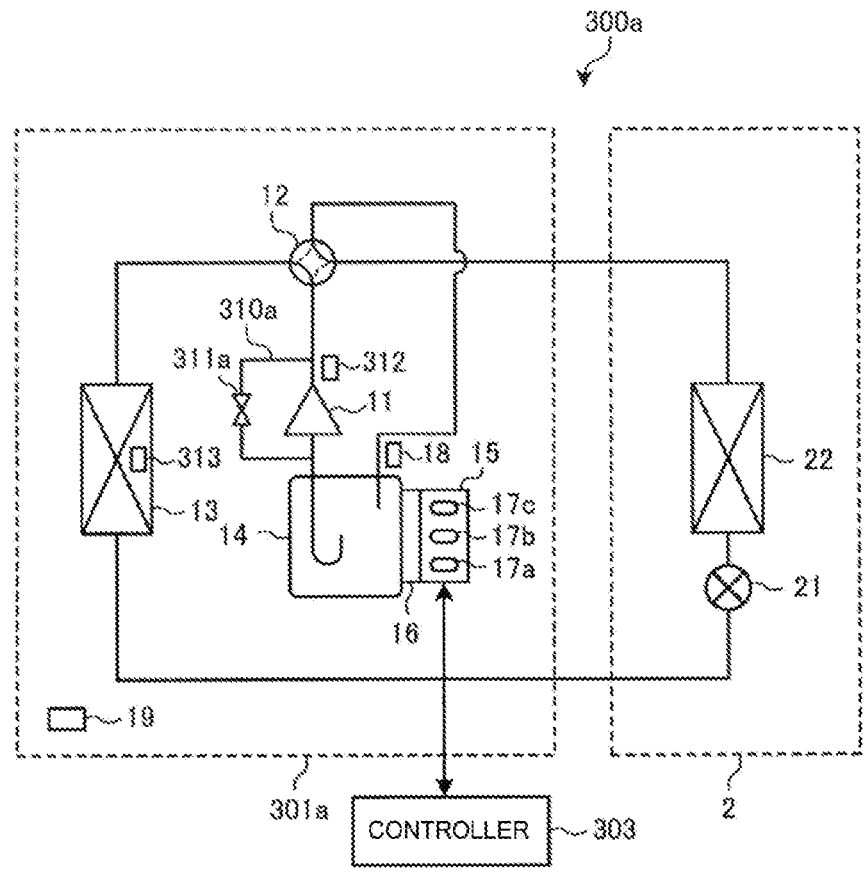
FIG. 12 is a schematic view illustrating an example of a configuration of an air-conditioning apparatus according to Embodiment 3.

FIG. 12 is a schematic diagram illustrating an example of a configuration of an air-conditioning apparatus 300a according to the present Embodiment 3. As illustrated in FIG. 12, the air-conditioning apparatus 300a is configured by an outdoor unit 301a, an indoor unit 2, and a controller 303. The outdoor unit 301a and the indoor unit 2 are connected by a refrigerant pipe, whereby a refrigerant circuit is formed.

(Outdoor Unit 301a)

The outdoor unit 301a includes the compressor 11, a refrigerant flow switching device 12, an outdoor heat exchanger 13, an accumulator 14 and a liquid level detection device 15. Further, the outdoor unit 301a includes a refrigerant temperature sensor 18 and an outside air temperature sensor 19. Further, in the present Embodiment 3, a bypass 310a is formed between a high-pressure side that is a discharge side of refrigerant in the compressor 11, and a low-pressure side that is a suction side of the refrigerant. The bypass 310a is provided with a bypass valve 311a.

The bypass 310a is provided to bypass high-temperature gaseous refrigerant discharged from the compressor 11 to the suction side of the compressor 11. The bypass valve 311a is, for example, a solenoid valve, and circulates or shuts off gaseous refrigerant flowing in the bypass 310a by opening and closing of the valve. Opening and closing of the bypass valve 311a is controlled by the controller 303.

Further, the outdoor unit 301a includes a discharge temperature sensor 312 and a condensing temperature sensor 313. The discharge temperature sensor 312 is provided at the discharge side of the compressor 11, and detects a temperature of gaseous refrigerant discharged from the compressor 11. The condensing temperature sensor 313 is provided in the outdoor heat exchanger 13, and detects a condensing temperature of refrigerant flowing in the outdoor heat exchanger 13.

(Controller 303)

The controller 303 controls a compressor frequency of the compressor 11, an opening degree of the expansion valve 21, etc., based on the detection result of the liquid level of the refrigerant in the accumulator 14 as in the case of the controller 3 according to Embodiment 1 and the controller 203 according to Embodiment 2. Further, in the present Embodiment 3, the controller 303 controls opening and closing of the bypass valve 311a based on the detection result of the liquid level of the refrigerant in the accumulator 14 during an operation and detection results of the discharge temperature sensor 312 and the condensing temperature sensor 313.

The controller 303 is one in which various functions are realized by executing software on an arithmetic and logic operation unit such as a microcomputer, or includes hardware or the like such as a circuit device realizing the various functions. Note that in this example, the controller 203 is provided outside of the outdoor unit 1 and the indoor unit 2, but the controller 303 is not limited to this and may be provided in either of the outdoor unit 1 and the indoor unit 2.

Figure 13:
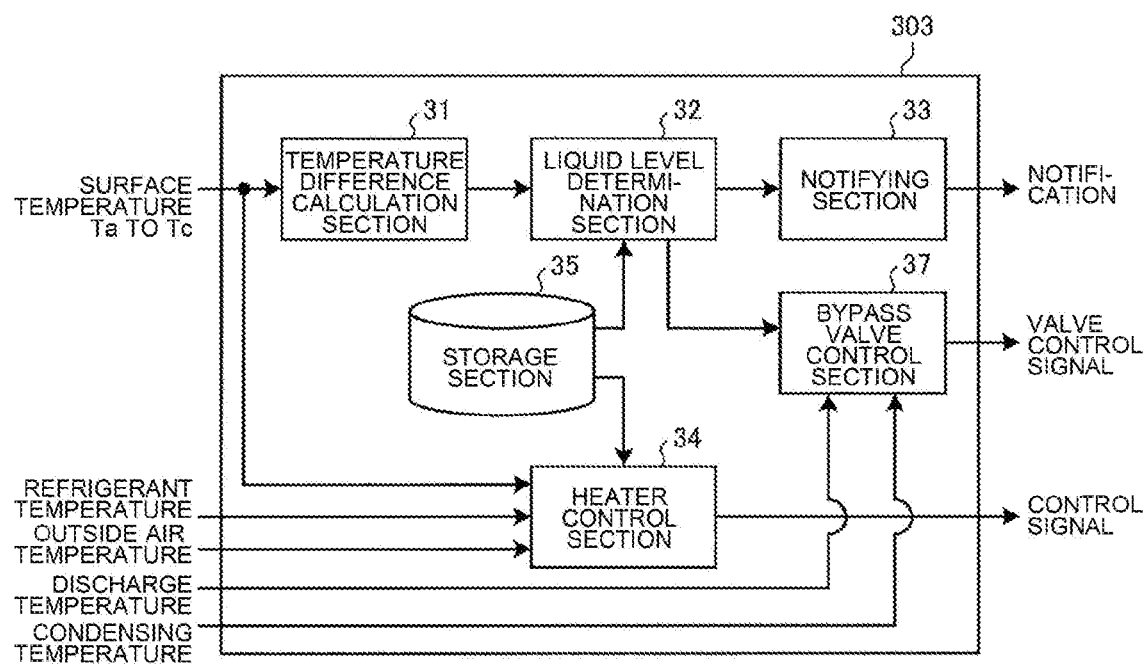
FIG. 13 is a functional block diagram illustrating an example of a configuration of a controller in FIG. 12.

FIG. 13 is a functional block diagram illustrating an example of a configuration of the controller 303 in FIG. 12. As illustrated in FIG. 13, the controller 303 includes a temperature difference calculation section 31, a liquid level determination section 32, a notifying section 33, a heater control section 34, a storage section 35 and a bypass valve control section 37.

The bypass valve control section 37 calculates a difference value TdSH between a discharge temperature obtained from the discharge temperature sensor 312, and a condensing temperature obtained from the condensing temperature sensor 313. Subsequently, the bypass valve control section 37 controls opening and closing of the bypass valve 311a based on a determination result by the liquid level determination section 32, and the calculated difference value TdSH. The bypass valve control section 37 supplies a valve control signal for controlling the bypass valve 311a to the bypass valve 311a.

Based on a magnitude of the value of the difference value TdSH, it is determined whether or not liquid refrigerant flows in the compressor 11. For example, when the value of the difference value TdSH is small, it is determined that there is a possibility of the liquid refrigerant being suctioned by the compressor 11.

In the present Embodiment 3, a difference threshold for the difference value TdSH used in the bypass valve control section 37 is stored in the storage section 35. The difference threshold is for determining whether or not there is the possibility of the liquid refrigerant is suctioned by the compressor 11. When the difference value TdSH is lower than the difference threshold, it is determined that there is the possibility that the liquid refrigerant is suctioned by the compressor 11. Further, when the difference value TdSH is the difference threshold or more, it is determined that the possibility that the liquid refrigerant is suctioned by the compressor 11 is low.

[Liquid Refrigerant Reduction Processing]

Reduction processing of the liquid refrigerant suctioned by the compressor 11 according to the present Embodiment 3 will be described. When the liquid refrigerant flows out from the accumulator 14 during operation of the air-conditioning apparatus 300a, the liquid refrigerant is suctioned by the compressor 11 and the possibility arises that "liquid back" occurs, the controller 303 controls the bypass valve 311a so that the bypass valve 311a opens. Thereby, high-temperature gas refrigerant discharged from the compressor 11 flows into the bypass 310a, and flows into the suction side of the compressor 11 via the bypass valve 311a.

At this time, the liquid refrigerant flowing out from the accumulator 14 joins the high-temperature gaseous refrigerant flowing in the bypass 310a on the suction side of the compressor 11, and evaporates by heat of the gaseous refrigerant. Thereby, the liquid refrigerant flowing out from the accumulator 14 is turned to be gaseous refrigerant, and the liquid refrigerant suctioned by the compressor 11 can be reduced.

Figure 14:
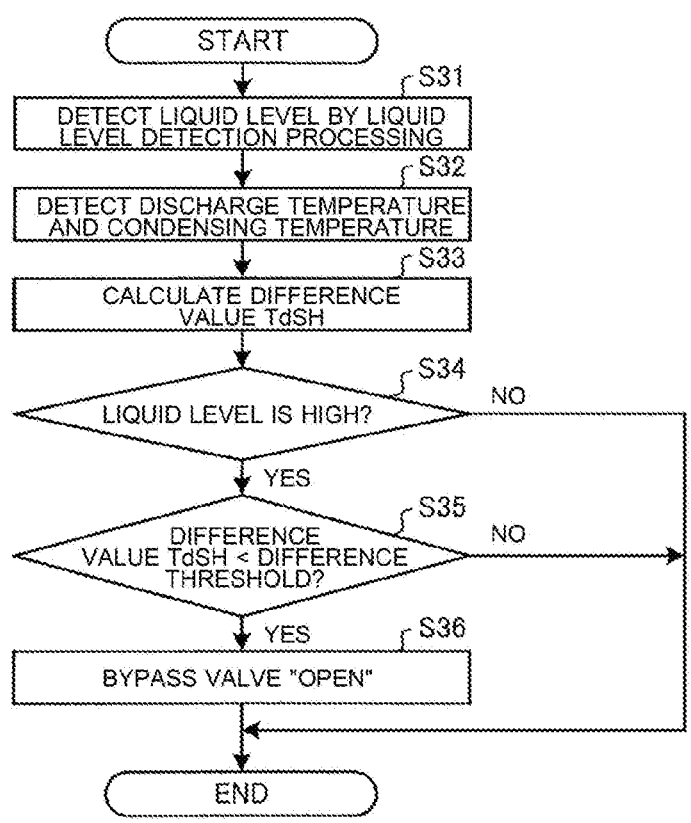
FIG. 14 is a flowchart illustrating an example of a flow of liquid refrigerant reduction processing in the air-conditioning apparatus according to Embodiment 3.

FIG. 14 is a flowchart illustrating an example of a flow of the liquid refrigerant reduction processing in the air-conditioning apparatus 300a according to the present Embodiment 3. In step S31, the liquid level detection processing (refer to FIG. 8) described in Embodiment 1 is performed, and the liquid level of the liquid refrigerant in the accumulator 14 is detected. In step S32, the discharge temperature sensor 312 detects a discharge temperature of the refrigerant discharged from the compressor 11. Further, the condensing temperature sensor 313 detects the condensing temperature of the refrigerant flowing in the outdoor heat exchanger 13.

In step S33, the bypass valve control section 37 calculates the difference value TdSH between the discharge temperature and the condensing temperature that are detected. In step S34, the bypass valve control section 37 determines whether or not the liquid level of the liquid refrigerant detected in step S31 is high. Here, a case where the liquid level of the liquid refrigerant in the accumulator 14 exists in an area A is determined as "the liquid level is high". When the liquid level of the liquid refrigerant is high (step S34; Yes), the process shifts to step S35. Further, when the liquid level of the liquid refrigerant is low (step S34; No), the controller 303 determines that "liquid back" to the compressor 11 does not occur, and a series of processing ends.

In step S35, the bypass valve control section 37 compares the difference value TdSH calculated in step S33 and the difference threshold stored in the storage section 35. When the difference value TdSH is smaller than the difference threshold as a result of comparison (step S35; Yes), the bypass valve control section 37 determines that there is a possibility that the liquid refrigerant is suctioned by the compressor 11, and controls the bypass valve 311a to open in step S36. On the other hand, when the difference value TdSH is the difference threshold or more (step S35; No), the controller 303 determines that the possibility that the liquid refrigerant is suctioned by the compressor 11 is low, and "liquid back" does not occur, and a series of processing ends.

In this way, in the present Embodiment 3, the bypass valve 311a is controlled based on the position of the liquid level of the liquid refrigerant in the accumulator 14, and the difference value TdSH obtained from the discharge temperature and the condensing temperature. Thereby, the liquid refrigerant suctioned by the compressor 11 evaporates, and therefore, the liquid refrigerant suctioned by the compressor 11 can be reduced.

Modification Example

Figure 15:
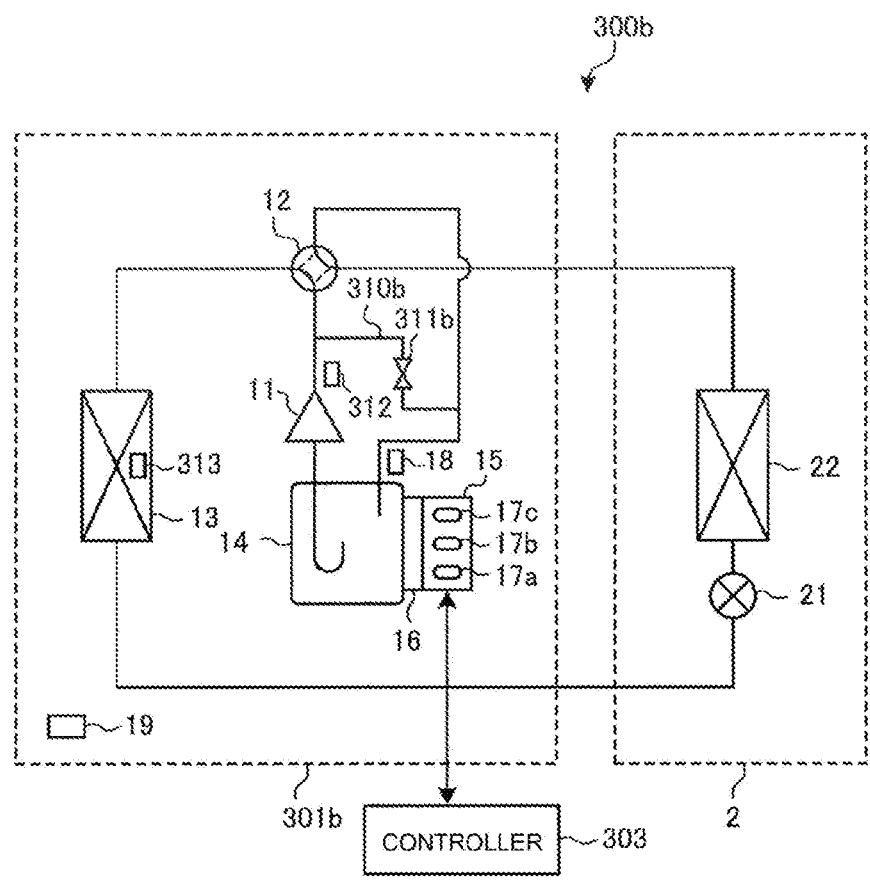
FIG. 15 is a schematic diagram illustrating an example of a configuration of an air-conditioning apparatus according to a modification example of Embodiment 3.

Next, a modification example of the present Embodiment 3 will be described. FIG. 15 is a schematic diagram illustrating an example of a configuration of an air-conditioning apparatus 300b according to the modification example of the present Embodiment 3. As illustrated in FIG. 15, the air-conditioning apparatus 300b includes an outdoor unit 301b, an indoor unit 2, and a controller 303. The outdoor unit 301b and the indoor unit 2 are connected by a refrigerant pipe, whereby a refrigerant circuit is formed. Further, in the air-conditioning apparatus 300b according to the modification example, a bypass 310b and a bypass valve 311b are provided, instead of the bypass 310a and the bypass valve 311a in the air-conditioning apparatus 300a in FIG. 12.

The bypass valve 311b is formed between a high-pressure side that is a discharge side of refrigerant in a compressor 11, and a low-pressure side that is an inflow side of an accumulator 14, and is provided to bypass high-temperature gaseous refrigerant discharged from the compressor 11 to the inflow side of the accumulator 14. The bypass valve 311b is, for example, a solenoid valve as in the case of the bypass valve 311a, and allows high-temperature gaseous refrigerant flowing in from the discharge side of the compressor 11 to flow out to an inflow side of the accumulator 14 by opening. Opening and closing of the bypass valve 311b is controlled by the controller 303.

In this way, by providing the bypass 310b and the bypass valve 311b, the high-temperature gaseous refrigerant discharged from the compressor 11 flows into the accumulator 14 via the bypass 310b and the bypass valve 311b. When the high-temperature gaseous refrigerant flows into the accumulator 14, the liquid refrigerant in the accumulator 14 evaporates to be gaseous refrigerant. As a result, the liquid refrigerant flowing out from the accumulator 14 decreases, and the liquid refrigerant that is suctioned by the compressor 11 can be reduced.

As mentioned above, in the air-conditioning apparatus 300a or 300b according to the present Embodiment 3, the bypass 310a or 310b is provided between the high-pressure side and the low-pressure side of the compressor 11, and the bypass valve 311a or 311b is provided on the bypass 310a or 310b. The bypass valve 311a or 311b is controlled based on the position of the liquid level of the liquid refrigerant in the accumulator 14, and the difference value TdSH between the discharge temperature and the condensing temperature. Thereby, the liquid refrigerant suctioned by the compressor 11 evaporates by the high-temperature gaseous refrigerant bypassed via the bypass 310a or 310b. Consequently, suction of the liquid refrigerant into the compressor 11 is suppressed, and "liquid back" to the compressor 11 can be prevented.

In the air-conditioning apparatus 300a, the bypass 310a is provided to bypass the discharge side and the suction side of the compressor 11. Thereby, the liquid refrigerant on the suction side of the compressor 11 evaporates by the high-temperature gaseous refrigerant bypassed via the bypass 310a, whereby the liquid refrigerant suctioned by the compressor 11 can be reduced.

In the air-conditioning apparatus 300b, the bypass 310b is provided to bypass the discharge side of the compressor 11, and the refrigerant inflow side of the accumulator 14. Thereby, the high-temperature gaseous refrigerant discharged from the compressor 11 flows into the accumulator 14 via the bypass 310b. Therefore, the liquid refrigerant in the accumulator 14 evaporates, and the liquid refrigerant flowing out from the accumulator 14 decreases, so that the liquid refrigerant suctioned by the compressor 11 can be reduced.

While Embodiments 1 to 3 of the present disclosure are described so far, the present disclosure is not limited to Embodiments 1 to 3 of the present disclosure described above, and various modifications and applications can be made within the range that does not depart from the gist of the present disclosure. For example, the liquid level detection device 15 is described as being attached to outside of the accumulator 14, but the liquid level detection device 15 is not limited to this, and may be attached to inside of the accumulator 14 in advance.

Further, the liquid level detection processing by the liquid level detection device 15 is described as being performed in the controller 3 of the air-conditioning apparatus 100, the controller 203 of the air-conditioning apparatus 200, the controller 303 of the air-conditioning apparatus 300a and 300b, but the control unit for performing the liquid level detection processing is not limited to these controllers, and may be provided separately from the controllers 3, 203 and 303.

Further, the liquid level detection device 15 can also be applied to a case of detecting the liquid level of a liquid in a container, for example, without being limited to the case of detecting the liquid level of the liquid refrigerant in the accumulator 14 provided in the air-conditioning apparatus 100.

Furthermore, in the present Embodiment 3, the bypass valve 311a is described as being opened only when the liquid level of the liquid refrigerant in the accumulator 14 is high, and the value of the difference value TdSH is small, but opening the bypass valve 311a is not limited to this example. For example, the bypass valve 311a may be opened when either one of the position of the liquid level of the liquid refrigerant or the value of the difference value TdSH satisfies the condition.

REFERENCE SIGNS LIST 1 outdoor unit, 2 indoor unit, 3, 203, 303 controller, 11 compressor, 12 refrigerant flow switching device, 13 outdoor heat exchanger, 14 accumulator, 15 liquid level detection device, 16 heater, 17a, 17b, 17c temperature sensor, 18 refrigerant temperature sensor, 19 outside air temperature sensor, 21 expansion valve, 22 indoor heat exchanger, 31 temperature difference calculation section, 32 liquid level determination section, 33 notifying section, 34 heater control section, 35 storage section, 36 frequency control section, 37 bypass valve control section, 100, 200, 300a, 300b air conditioning apparatus, 140 liquid level, 141 sealed container, 142 inflow pipe, 143 outflow pipe, 143a liquid inlet, 143b gas inlet, 151 belt section, 152 heat-insulating material, 310a, 310b bypass, 311a, 311b bypass valve, 312 discharge temperature sensor, 313 condensing temperature sensor

The invention claimed is:

1. A liquid level detection device detecting a liquid level of a liquid in a container, comprising:
   a plurality of heaters configured to heat the container;
   a plurality of temperature sensors provided at different heights of the container, and configured to detect surface temperatures of the container; and
   a controller configured to control the heating by the heaters based on the surface temperatures of the container detected by the plurality of temperature sensors, and detect the liquid level of the liquid in the container based on the surface temperatures of the container detected by the plurality of temperature sensors when the heaters are caused to heat;
   wherein the plurality of temperature sensors and the plurality of heaters are arranged in an alternating pattern on the container such that the plurality of temperatures sensors do not overlap the plurality of heaters, none of the plurality of temperatures sensors is adjacent to another of the plurality of temperatures sensors, and none of the plurality of heaters is adjacent to another of the plurality of heaters.

2. The liquid level detection device of claim 1, wherein the plurality of temperature sensors include a reference temperature sensor installed at a lowermost portion, and configured to detect a reference temperature, and a determination temperature sensor installed at a position higher than the reference temperature sensor, and the controller calculates a temperature difference between the reference temperature detected by the reference temperature sensor, and a surface temperature detected by the determination temperature sensor, and determines a position of the liquid level of the liquid in the container based on comparison of the temperature difference and a threshold for the temperature difference.

3. The liquid level detection device of claim 2, wherein the reference temperature sensor is installed at a position where the liquid exists.

4. The liquid level detection device of claim 2, wherein the controller determines that the liquid level of the liquid in the container exists in an area at a lower side from the determination temperature sensor when the temperature difference is the threshold or more.

5. The liquid level detection device of claim 2, wherein the controller further includes a notifier configured to notify a determination result by the liquid level determination section.

6. The liquid level detection device of claim 1, further comprising:

a belt section that is long, wherein the plurality of heaters and the plurality of temperature sensors are provided on the belt section, and the belt section is wound around the container so that a longitudinal direction of the belt section is along a height direction of the container in such a manner that the plurality of heaters and the plurality of temperature sensors contact a surface of the container.

7. An accumulator that separates refrigerant into liquid refrigerant and gaseous refrigerant, and is the container that stores the liquid refrigerant, wherein the liquid level detection device of claim 1 is attached, and the liquid level detection device detects a liquid level of the stored liquid refrigerant.

8. The accumulator of claim 7, comprising:

a U-shaped outflow pipe having a liquid inlet allowing the liquid refrigerant to flow in and a gas inlet taking in the gaseous refrigerant formed, and allowing the refrigerant flowing in to flow out, wherein the plurality of temperature sensors include a first temperature sensor installed at a lowermost portion, and configured to detect a reference temperature, and a second temperature sensor installed at an uppermost portion, the first temperature sensor is provided at a lower side from the liquid inlet, and the second temperature sensor is provided at a lower side from the gas inlet.

9. The accumulator of claim 7, wherein the liquid level detection device is attached to a surface.

10. An air-conditioning apparatus, comprising the accumulator of claim 7.

11. The air-conditioning apparatus of claim 10, further comprising:

a compressor in which a suction side of the refrigerant is connected to an outflow side of the refrigerant in the accumulator, and configured to compress the refrigerant flowing out from the accumulator and discharge the refrigerant, wherein the controller controls a compressor frequency based on a position of a liquid level of the liquid refrigerant that is detected.

12. The air-conditioning apparatus of claim 11, wherein the controller determines the compressor frequency so that a higher detected liquid level position of the liquid refrigerant results in a lower compressor frequency.

13. The air-conditioning apparatus of claim 12, further comprising an outside temperature sensor that detects an outside temperature, wherein the controller controls the heaters based on the outside temperature detected by the outside temperature sensor, and when the outside temperature is equal to or lower than a third set temperature, the heaters is turned on.

14. The air-conditioning apparatus of claim 10, further comprising:

a compressor in which a suction side of the refrigerant is connected to an outflow side of the refrigerant in the accumulator, and configured to compress the refrigerant flowing out from the accumulator and discharge the refrigerant;

a heat exchanger configured to condense the refrigerant;

a bypass configured to bypass a high-pressure side and a low-pressure side of the compressor;

a bypass valve provided in the bypass, and configured to circulate or shut off the refrigerant flowing in the bypass by opening and closing;

a discharge temperature sensor configured to detect a discharge temperature of the refrigerant discharged from the compressor; and a condensing temperature sensor configured to detect a condensing temperature of the refrigerant flowing in the heat exchanger, wherein the controller calculates a difference value between the discharge temperature and the condensing temperature, and control opening and closing of the bypass valve based on the calculated difference value, and a position of the liquid level of the liquid refrigerant that is detected.

15. The air-conditioning apparatus of claim 14, wherein the bypass is provided to bypass a discharge side and a suction side of the compressor.

16. The air-conditioning apparatus of claim 14, wherein the bypass is provided to bypass a discharge side of the compressor, and an inflow side of the refrigerant in the accumulator.

17. The accumulator of claim 7, further comprising a refrigerant temperature sensor that detects a temperature of a refrigerant that flows in, wherein the controller controls the heaters based on the surface temperatures of the container detected by a plurality of the temperature sensors and the refrigerant temperature detected by the refrigerant temperature sensor, and turns the heaters on when a temperature difference between a first surface temperature of the container detected by a first temperature sensor selected from the plurality of temperature sensors and the refrigerant temperature is equal to or lower than a second set temperature.

18. The liquid level detection device of claim 1, wherein the controller controls the heaters based on the surface temperatures of the container detected by a plurality of the temperature sensors, and when the surface temperatures of the container detected by the plurality of temperature sensors are equal to or lower than a first set temperature, the heaters is turned on.

19. An air-conditioning apparatus, comprising:

an accumulator that separates refrigerant into liquid refrigerant and gaseous refrigerant, and is a container that stores the liquid refrigerant;

a heater configured to heat the accumulator;

a plurality of temperature sensors respectively disposed at different heights with respect to the accumulator, and detects a plurality of surface temperatures of the accumulator;

a controller configured to control a liquid level of the liquid refrigerant in the accumulator based on the surface temperatures of the accumulator detected by the plurality of the temperature sensors;

a liquid level detection device that detects liquid level of the liquid refrigerant stored in the accumulator;

a compressor in which a suction side of the refrigerant is connected to an outflow side of the refrigerant in the accumulator, and configured to compress the refrigerant flowing out from the accumulator and discharge the refrigerant;

a heat exchanger configured to condense the refrigerant;

a bypass configured to bypass a high-pressure side and a low-pressure side of the compressor;

a bypass valve provided in the bypass, and configured to circulate or shut off the refrigerant flowing in the bypass by opening and closing;

a discharge temperature sensor configured to detect a discharge temperature of the refrigerant discharged from the compressor; and a condensing temperature sensor configured to detect a condensing temperature of the refrigerant flowing in the heat exchanger, wherein the controller calculates a difference value between the discharge temperature and the condensing temperature, and controls opening and closing of the bypass valve based on the calculated difference value, and a position of the liquid level of the liquid refrigerant that is detected.

* * * * *